July 8, 1969     E. J. CRANE     3,453,683
POULTRY PICKER

Filed Oct. 17, 1966     Sheet 1 of 2

INVENTOR.
EDWARD J. CRANE
BY
ATTORNEYS

July 8, 1969

E. J. CRANE 3,453,683

POULTRY PICKER

Filed Oct. 17, 1966

INVENTOR.
EDWARD J. CRANE

BY *Price & Heneveld*

ATTORNEYS

United States Patent Office 3,453,683
Patented July 8, 1969

3,453,683
POULTRY PICKER
Edward J. Crane, Ottumwa, Iowa, assignor to International Agri-Systems Inc., Ottumwa, Iowa, a corporation of Iowa
Filed Oct. 17, 1966, Ser. No. 587,073
Int. Cl. A22c *21/62*
U.S. Cl. 17—11.1
10 Claims

ABSTRACT OF THE DISCLOSURE

A poultry plucking apparatus including two series of elongated rods defining therebetween a path for poultry travel. The rods are reciprocated in generally up-and-down fashion, alternate of the rods in each series being reciprocated oppositely. Plucking members in the form of fingered disks, spheres or the like are provided on the rods for wiping the feathers from the poultry.

---

This invention relates to poultry picking machines and, more particularly, to reciprocating poultry machines suitable for utilization in assembly-line poultry dressing installation.

In the preparation of poultry for commercial distribution one of the steps which must be taken is the removal of the feathers from the fowl. A number of different arrangements have been proposed whereby the de-feathering operation may be executed automatically while the birds are passing through the processing line. Prior art machines have consisted primarily of varying arrangements of rotating drums having a plurality of flexible rubber picking fingers extending radially from the peripheries thereof. The fowl are usually suspended head down from a suitable over-head conveyor and conveyed through these drum arrangements wherein the flexible picking fingers wipe the feathers therefrom.

The conventional picking drums usually revolve in such a manner that the picking fingers sweep over the bird in a downward direction. Because of the circular path of the fingers, the picking action is generally concentrated over rather limited areas of the bird body. Often, many of the feathers are missed by machines of this type and must be removed later by hand or other machines resulting in increased operating expense and limiting production.

Various arrangements have been proposed as a means of circumventing the tendency of the drums to concentrate the picking forces at particular sections of the bird. One such device is disclosed in United States Patent No. 2,743,477, issued May 1, 1965. The machine disclosed in this patent replaces the conventional spinning drums with a plurality of elongated fingers which move up and down in arcuate fashion adjacent both sides of the path of bird travel through the machine. Alternate sets of the fingers move in opposite directions. This arrangement eliminates to some extent the problem of localized over-picking and, additionally, subjects the bird to the wiping action of the fingers in different directions as it passes through the picker. The opposite directions of movement of the various fingers serve to position the bird in relation to the over-head shackle, insuring that it will not be thrown free therefrom.

While the device disclosed in the above noted patent eliminated many of the difficulties which had been encountered in the utilization of rotating pickers, the arc-like path of travel of the individual elongated picking fingers still resulted in some localized over-picking and some missed feathers. The localized over-picking problem is of particular importance since birds having barked areas on their skin do not qualify for optimum grading and, thus, must be disposed at a markedly reduced price.

It is an object of this invention to provide a poultry picking machine which is capable of defeathering the entire bird without over-picking localized areas thereof.

More particularly, it is an object of this invention to provide a poultry picker which subjects the birds to picking forces in a plurality of directions as they are passed through the machine and, yet, does not require any type of bird positioning device with the exception of the conventional over-head shackle.

It is object of this invention to provide a poultry picking device wherein at least some of the picking members stay in contact with the bird being processed during their entire cycle.

It is an object of this invention to provide a poultry picking apparatus which is capable of applying defeathering scrubbing forces simultaneously over the entire length of the fowl body.

More particularly, it is an object of this invention to provide a poultry picking apparatus wherein the fowl is subjected to variously directed picking forces at all times and, yet, does not have these forces sufficiently localized at any section of the bird to result in barking of the fowl skin or bruising of the meat.

Still another object of this invention is to provide a novel poultry picking member for utilization in conjunction with an apparatus of the type described which is capable of effectively scrubbing the feathers from all sections of the bird's body without necessitating such a degree of bearing force as to risk injury to the skin or meat.

These and other objects of this invention will be clearly understood by reference to the following specification and accompanying drawings in which:

FIG. 2 is a broken, fragmentary side-elevational view of one of the carriage assemblies;

Briefly, this invention comprises a framework having a pair of carriages pivotably mounted therein. Reciprocally mounted within each of the carriages are a series of aligned picking members which may, conveniently, take the form of rods. The spacing of the carriages and the two series of aligned rods is such that a path is formed between the series of aligned rods through which the poultry travels as it is being defeathered. Means are provided for adjusting the distance between the bottoms of the rod carrying carriage. This adjustment provides a means whereby the width and slope of the path may be altered so as to accommodate various types of poultry.

Means are provided for reciprocating the rods within their respective carriages. These means are such that adjacent rods within a given series are reciprocated in opposite directions. This reciprocation may be accomplished by means of an eccentric arrangement. Preferably, reciprocation of each series of rods i.e. those rods mounted within one carriage is planar such that each rod moves up and down within the carriage along a straight line path.

The picking members which contact the birds are positioned along the reciprocating rods. These members are preferably flexible, usually being fabricated from rubber. In one embodiment of this invention, the picking members comprise rubber discs having notched circumferences stacked and appropriately spaced on each of the reciprocating rods. The notched circumferences of the picking members scrub or wipe the feathers from the birds as they pass through the apparatus. In another embodiment, the picking members comprise spherical balls having radial protrusions about their surfaces. A plurality of the balls are affixed to the reciprocating rods and the radial protrusions make contact with the birds to wipe or scrub the feathers therefrom as the rods are reciprocated.

Figure 1:
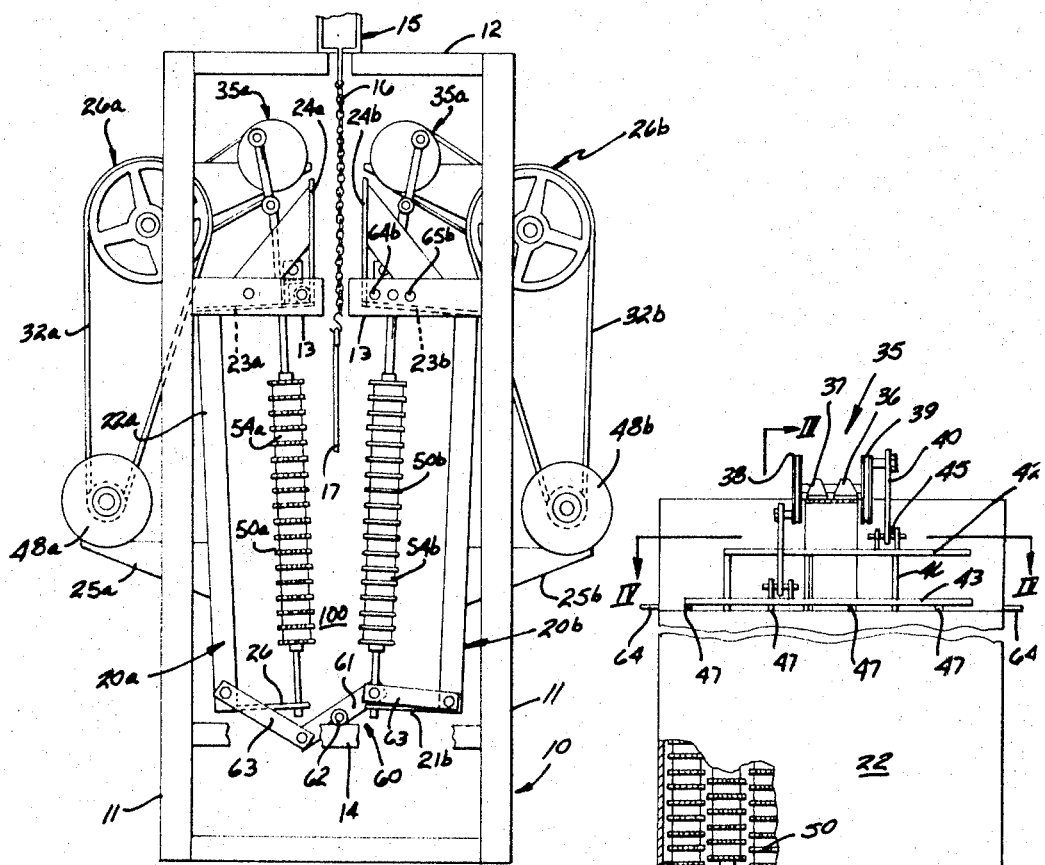
FIG. 1 is an end-elevational view of the picking apparatus.

Referring now to the figures, a preferred embodiment of this invention will be described in detail. FIG. 1 shows the picking apparatus having a frame indicated generally by the reference numeral 10. The frame 10 consists of a plurality of uprights 11 which are retained in spatial position by a series of cross braces 12 and a series of longitudinal braces (not shown). Converging support arms 13 are affixed to each pair of end uprights 11 in the manner shown. A second arm 14 also connects each pair of uprights 11 to provide, as will become apparent hereinafter, a stationary member wherefrom adjustment of the picking path dimensions may be made.

Upper cross member 12 supports a conventional overhead conveyor assembly 15 having a plurality of chains 16 and conventional shackles 17 suspended therefrom. As will be appreciated by those skilled in the art, over-head conveyor assembly 15 functions to continually convey the poultry to be picked through the picking apparatus. Preferably shackles 17 are of the type from which the birds are suspended by their legs in head-down fashion.

Figures 3, 4:
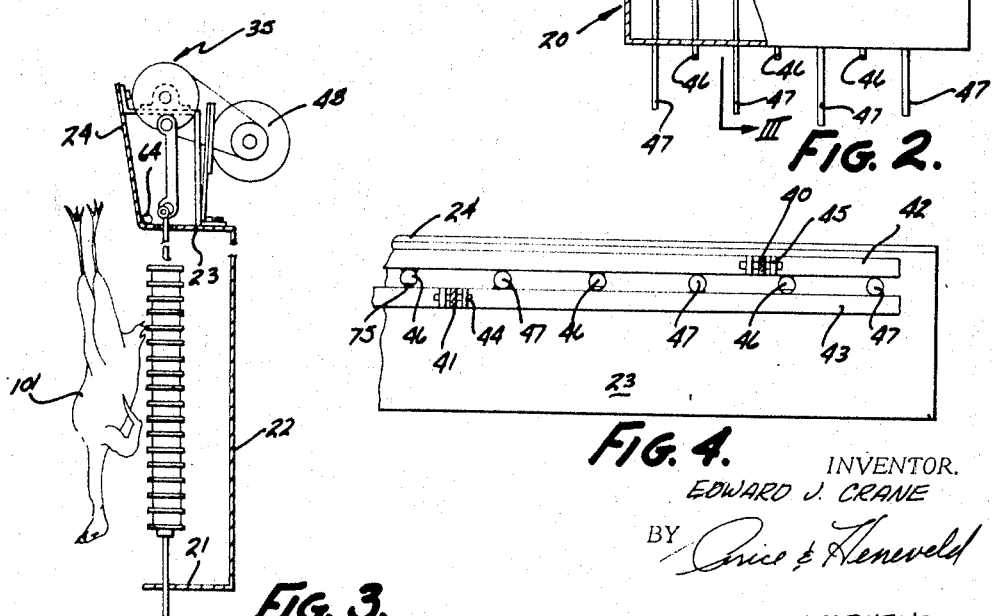
FIG. 3 is a cross-sectional view taken along line III—III of FIG. 2 and illustrating a modified drive motor positioning scheme from that shown in FIG. 1.
FIG. 4 is a fragmentary cross-sectional view taken along line IV—IV of FIG. 2.
Figure 5:
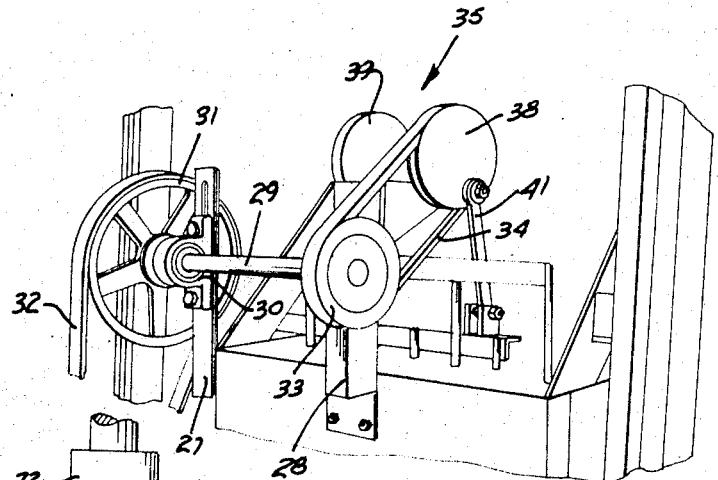
FIG. 5 is a fragmentary perspective view of one of the carriage driving assemblies.

Referring additionally to FIGS. 2 through 5, a pair of carriage assemblies 20a and 20b are pivotally positioned within frame 10 by means of pivot rods 64 which pass through pivot arm receiving apertures 65 on support arms 13. Each of the carriage assemblies 20a and 20b has a bottom guide plate 21, a back plate 22, a top guide plate 23 and an upstanding support plate 24. In the embodiment shown in FIG. 1, back plates 22a and 22b have motor mounts 25a and 25b respectively extending therefrom. Conventional electric motors 48 are mounted on motor mounts 25 and drive speed reduction assemblies 26. As shown best in FIG. 5, each of the speed reduction assemblies 26 comprises a pair of supports 27 and 28 which carry a shaft 29 by means of suitable bearings 30. Shaft 29 has a relatively large drive pulley 31 rotatably mounted at one end thereof which is connected to motor 48 by means of drive belt 32. The opposite extremity of shaft 29 has a smaller pulley 33 rotatably affixed thereto which drives the dumbbell eccentric assembly 35 by means of eccentric drive belt 34. Alternately, the dumbbell eccentric assembly 35 may be driven directly from motor 48 as indicated in FIG. 3. In this case, motor 48 may be mounted directly to upper guide plate 23 by means of a suitable motor mount 74.

Each of the dumbbell eccentric assemblies 35a and 35b consist of a shaft 36 (see FIG. 2) suitably borne on support 28 by means of bearings 37. A pair of eccentric drag wheels 38 and 39 are mounted to opposite ends of shaft 36. Eccentric 38 is connected to lift bar 43 by means of a connecting rod 41. Both connections to connecting rod 41, of course, must be pivotable. A connection such as that shown at 44 has been found suitable. In a similar mannner, eccentric wheel 39 is connected to lift bar 42 by means of connecting rod 40 which is pivotably affixed to the lift bar at 45.

Lift bars 42 and 43 each have a plurality of reciprocable members, 46 and 47 respectively, affixed thereto for up and down movement as viewed in FIG. 3. The reciprocable members 46 and 47 may comprise conveniently, metal rods. Each of these rods is slidably journalled within top guide plate 23 and bottom guide plate 21 for reciprocating movement along a fixed axis. As viewed in FIG. 4, the connection of lift bars 42 and 43 to the reciprocal members 46 and 47 is such that all of the rod members within a particular carriage are as nearly aligned as possible. This may be done by affixing lift bar 42 to reciprocable members 46 along one side thereof and affixing lift bar 43 to reciprocable members 47 along the opposite side thereof. If necessary, the reciprocable members may be notched as indicated at 75 to insure proper clearance of the interworking components.

From an examination of FIG. 2, it will be seen that as the dumbbell eccentric system 35 is rotated by motor 48, lift bars 42 and 43 are alternatively raised and lowered. This raising and lowering causes reciprocable members 46 and 47 to move up and down within carriage 20 in such a manner that adjacent reciprocable members 46 and 47 move in opposite directions. The reciprocable members 46 and 47 mounted within a given carriage all move in approximately the same plane. That is to say, that these members do not move arcuately into and out of the path 100 which they define for passage of the bird to be picked. Rather, they move up and down along the sides thereof always staying in the same general plane which forms the boundary of path 100.

Figure 8:
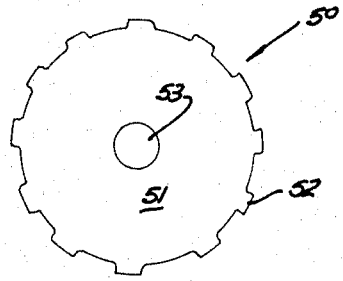
FIG. 8 is a plan view of another type of picking member which is shown mounted in the machine in FIGS. 1 through 4.

The scrubbing or wiping of the feathers from the birds is done by a plurality of picking discs 50 which are stacked on each of the reciprocable members or rods 46 and 47. As shown in FIGS. 1 and 8, each of the picking discs has a relatively circular support section 51 which has a plurality of ridges or notches 52 around the outer circumference thereof. A shaft receiving aperture 53 is provided for receiving reciprocable members 46 and 47. The discs are formed preferably from some flexible type of material such as hard rubber.

When the picking discs 50 are being placed on the reciprocable members 46 and 47, they are spaced preferably by a plurality of suitable spacers 54. They are fastened to the shaft by suitable fastening devices 55 located at both the top and bottom of each of the reciprocable members. Preferably, fastening devices 55 are such that the picking discs 50 will not be allowed to rotate about rods 46 and 47 when the machine is in operation. That is to say, that the same sections of the peripheries of each of the discs 50 will always engage the birds to wipe the feathers therefrom. Once these sections have been worn down, however, they may be replaced by merely loosening fastening devices 55 and rotating each of the picking discs 50 about their respective reciprocable members until such point as the unused sections of their peripheries lie adjacent path 100.

The width and side slopes of the path 100 may be adjusted by repositioning pivot arms 64 within different pivot arm receiving apertures 65 and support arms 13 and by manipulating adjustment assembly 60. Adjustment assembly 60 consists of an arm 61 which is rotatably affixed to cross members 14 of frame 10 at 62. A pair of connecting rods 63 connect the extremities of arm 61 to the back plates 22 of carriage assemblies 20a and 20b (see FIG. 1). Adjustment assembly 60 preferably is incorporated into the machine at each longitudinal extremity thereof and the two arms 61 slaved together by means of a common shaft rotatably interconnecting them such that, when the shaft is rotated, the arms 61 at both ends of the machine will displace with respect to frame members 14 identically. The end of the shaft might, for example, be provided with a conventional crank mechanism along, of course, with some means for securing the shaft from rotation after the proper adjustment has been made. The interconnections of arms 61, connecting rods 63 and back plates 22 of course, are pivotable. Thus, as arm 61 is rotated counter clockwise as viewed in FIG. 1, the lower sections of carriages 20a and 20b will be pulled toward each other narrowing the path 100 by decreasing the slopes of its sides. The provision of pivot arms 64 acting in conjunction with pivot arm receiving aperture 65 allows this pivotable movement to occur. It will be noted that such adjustment presents no belt tension problem as the driving motors 48 and the speed reduction assemblies 26 are coupled directly to their respective carriages rather than to frame 10. If arm 61 is rotated in a clockwise direction as viewed in FIG. 1, the lower sections of carriages 20a and 20b will be pushed away from each other, thus effectively widening the path 100 by increasing the slope of its boundaries. By selectively positioning pivot arms 64 within pivot arm receiving apertures 65 to control the width of the path at the top thereof, and by selectively manipulating adjustment assembly 60, the path 100 may be shaped so as to most effectively accommodate varying sizes and shapes of birds.

Figure 6:
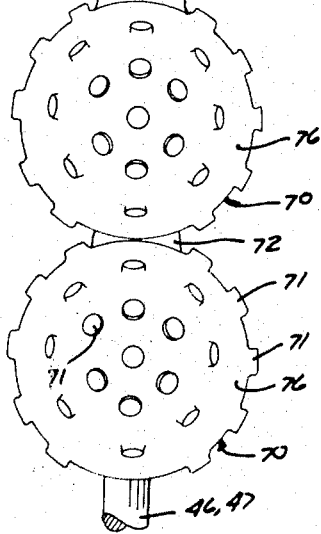
FIG. 6 is a fragmentary side-elevational view of one type of picking member which may be utilized in conjunction with the picking apparatus.
Figure 7:
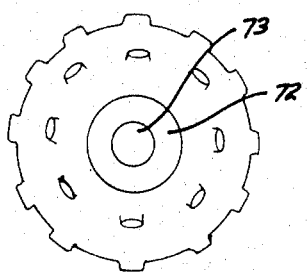
FIG. 7 is a plan view of the picking member shown in FIG. 6.

Referring now to FIGS. 6 and 7, there is shown an alternative type of picking member which may be utilized in the picking apparatus shown in FIGS. 1 through 5. The ball-shaped picker 70 comprises a generally spherical body section 76, having a plurality of nipples 71 extending generally radially therefrom. The pickers 70 preferably are fabricated from some type of resilient material such as rubber. Each has a spacing collar 72 formed integrally therewith. Spacing collars 72 function to space the ball-shaped picker 70 on the reciprocable shafts 46 and 47. A shaft receiving aperture 73 is provided in the ball-shaped picker 70 for receiving one of the reciprocating members. Preferably, the entire ball-shaped assembly may be molded integrally.

The ball-shaped picking members 70 are installed into the picking apparatus shown in FIG. 1 in a manner similar to that utilized for installation of the disc-shaped pickers 50. That is to say, that a plurality of pickers 70 are placed on each of the reciprocating members 46 and 47 and fastened thereto by any conventional fastening device 55. As is the case with disc-shaped pickers 50, pickers 70 preferably are not free to rotate around the reciprocating shafts 46 and 47 while the machine is in operation. Rather, they are permanently positioned on the shafts until such time as it is desired to rotate them so as to bring an unused picking surface into working relationship with path 100. There may be, however, certain types of picking operations which will be performed most effectively if the ball 70 or discs 50 are mounted in idler fashion on the reciprocating members 46 and 47. Best results have been obtained thus far by preventing such idler rotation but it is certainly within the concepts of this invention to do otherwise.

Operation

Initially, the position of pivot arms 64 on supports 13 and the adjustment of assembly 60 must be made so as to provide a path through the picking machine which is suitable for the picking of the particular type of bird to be processed. Once a desirable shape has been chosen, motors 48a and 48b are activated. Motor 48a rotates speed reduction assembly 26a which in turn rotates dumbbell eccentric assembly 35a. The rotation of dumbbell eccentric assembly 35a causes the reciprocable members 46a and 47a to move alternately up and down within carriage 20a. Similarly, the activation of motor 48b causes reciprocable members 46b and 47b to move alternately up and down within carriage 20b.

Over-head conveyor system 15 is then activated and the birds to be picked are suspended in head-down fashion from shackles 17. As birds 101 pass into the picking path 100, their feathers are wiped or scrubbed away by the reciprocating movement of the nipples or notches 52 or 71 on disc-shaped pickers 50 or ball-shaped pickers 70. The reciprocating action of members 46 and 47 causes the main edible sections of the birds to be completely wiped free of feathers.

The relatively short lengths of the nipples 52 or 71 prevent the birds from being slapped as in the case with long flexible picking fingers rotating on a high speed drum. Such slapping is highly undesirable as it results in barking and bruising of the skin, rendering the bird unfit for highest-price distribution.

As the bird passes through the path 100, it is sequentially contacted by the series of reciprocating picking members, alternate ones of which are moving in opposite directions. While 14 of the reciprocating members (7 in each carriage) are shown in the preferred embodiment, it will be apparent to those skilled in the art that this number may be enlarged or decreased depending upon the particular picking conditions encountered. The lateral alignment of the reciprocating members in opposite carriages also depends upon the particular type of picking conditions being encountered. That is to say that for some types of birds, it is best to fabricate the machines such that the 7 reciprocating members on carriage 20a are directly opposite the corresponding reciprocating members on carriage 20b. For other types of conditions, it may be desirable to have the reciprocating members on carriage 22a form isosceles triangles with the reciprocating members on carriage 20b. Likewise, it may be necessary to adjust the order in which the reciprocable members in carriages 20a and 20b go up and down with respect to each other so as to best meet the particular picking conditions encountered. In this regard, it has been found that where the picking members in carriages 20a and 20b are laterally aligned, opposite members should move in opposite directions under most picking conditions. That is to say, as viewed in FIG. 1, the visible reciprocating assembly associated with carriage 20a would be going up while the visible reciprocating assembly associated with carriage 20b would be going down. This cycling is not particularly critical, however, and may be varied intentionally by the sequence in which motors 48a and 48b are activated and may be varied unintentionally by belt slippage, r.p.m. difference and the like.

The rubber discs 50 may be, for example about 2½ inches in diameter and about ¼ inch thick. The nipples 52, as shown in FIG. 8, protrude a relatively short distance with respect to the diameter of the disc. Similar dimensional comments are pertinent with regard to ball-shaped pickers 70. Undoubtedly a wide variety of picking member configurations can be conceived by those skilled in the art and the two embodiments illustrated are not shown as a means of limiting the over-all scope of this invention.

While a preferred embodiment of this invention, along with certain modifications and alternative embodiments thereof, has been described in detail, it will be apparent to those skilled in the art that many other embodiments and modifications may be conceived without departing from the basic concepts disclosed in this specification.

I claim:
1. Apparatus for plucking poultry comprising:
   a frame;
   first and second series of generally aligned members mounted within said frame for reciprocating movement in first and second planes, respectively, said first series of aligned members being spaced from said second series of aligned members so as to form therebetween a path for poultry travel, said members having interrupted surfaces for rubbing the feathers from the poultry as they pass along said path; and
   means for reciprocating said members within said frame, said means reciprocating said first series of members in said first plane and said second series of members in said second plane.

2. Apparatus as set forth in claim 1 wherein said reciprocating means comprises means for reciprocating adjacent members of said first series in opposite directions and means for reciprocating adjacent members of said second series in opposite directions.

3. The apparatus as set forth in claim 1 wherein said reciprocating means for each of said series comprises:
   first and second bars connecting alternate members of said each series of members, said first bar being connected to a given member and said second bar being connected to the members adjacent said given member; and eccentric means for moving said first bar in one direction while said second bar is moved in the opposite direction.

4. The combination as set forth in claim 1 which further comprises means for adjusting the angle and thus the slope of the boundaries of said path between said first and second series of members.

5. The combination as set forth in claim 4 wherein said adjusting means comprises first and second carriages privotably affixed to said frame, said first series of members being mounted for reciprocating movement within said first carriage and said second series of members being mounted for reciprocating movement within said second carriage; and means for varying and selectively retaining the pivotable position of said carriages with respect to said frame.

6. The combination as set forth in claim 1 wherein said reciprocating means comprises means for reciprocating at least one of the members in one of said series in a direction opposite to that direction in which another of the members in said one of said series is reciprocating.

7. The apparatus as set forth in claim 6 in which said interrupted surfaces comprise a plurality of flexible nipples extending from the surfaces of a plurality of support sections mounted on said members for movement therewith.

8. The apparatus as set forth in claim 7 wherein said support sections are generally disc-shaped and said nipples extend generally radially from the circumference thereof.

9. The apparatus as set forth in claim 7 wherein said support section is generally spherical and said nipples extend generally radially from the surface thereof.

10. Apparatus for plucking poultry, said apparatus comprising:

a frame;

first and second picking supports mounted within said frame for movement in first and second planes, respectively, said first support being spaced from said second support so as to form therebetween an elongated path for poultry travel, said supports having picking members with interrupted surfaces affixed thereto and extending into said path for rubbing the feathers from the poultry as they pass along said path; and means for reciprocating said supports within said frame, said means reciprocating said first support member in said first plane and said second support member within said second plane.

References Cited

UNITED STATES PATENTS

| | | | |
|---|---|---|---|
| 2,314,700 | 3/1943 | Hanshaw | 17—11.1 |
| 2,523,302 | 9/1950 | Hunt | 17—11.1 X |
| 2,571,034 | 10/1951 | Harvey | 17—11.1 |
| 2,714,222 | 8/1955 | McKendree | 17—11.1 |
| 2,743,477 | 5/1956 | Barker et al. | 17—11.1 |
| 2,945,257 | 7/1960 | Corey et al. | 17—11.1 |
| 3,044,108 | 7/1962 | De Long | 17—11.1 |
| 3,122,778 | 3/1964 | Crane et al. | 17—11.1 |

LUCIE H. LAUDENSLAGER, *Primary Examiner.*